US008886679B2

(12) United States Patent
Barkol et al.

(10) Patent No.: US 8,886,679 B2
(45) Date of Patent: Nov. 11, 2014

(54) MINING WEB APPLICATIONS

(75) Inventors: Omer Barkol, Haifa (IL); Ruth Bergman, Haifa (IL); Shahar Golan, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 234 days.

(21) Appl. No.: 13/271,036

(22) Filed: Oct. 11, 2011

(65) Prior Publication Data

US 2013/0091414 A1 Apr. 11, 2013

(51) Int. Cl.
*G06F 17/00* (2006.01)
*G06F 17/30* (2006.01)

(52) U.S. Cl.
CPC ............ *G06F 17/00* (2013.01); *G06F 17/3089* (2013.01)
USPC ............ 707/797; 707/811; 715/234; 715/242

(58) Field of Classification Search
CPC ............ G06F 17/3092; G06F 17/2247; G06F 17/227; G06F 17/00; G06F 17/3089
USPC .................. 707/797, 778, 829, 811, E17.012, 707/E17.05, E17.118; 715/234, 242, 715/FOR. 253
See application file for complete search history.

(56) References Cited

U.S. PATENT DOCUMENTS

| | | | |
|---|---|---|---|
| 2005/0038785 A1 | 2/2005 | Agrawal et al. | |
| 2005/0228768 A1 | 10/2005 | Thusoo et al. | |
| 2006/0111896 A1* | 5/2006 | Menezes et al. | 704/10 |
| 2007/0005615 A1* | 1/2007 | Dodge | 707/100 |
| 2007/0050708 A1* | 3/2007 | Gupta et al. | 715/513 |
| 2007/0083808 A1* | 4/2007 | Setlur et al. | 715/513 |
| 2007/0150443 A1* | 6/2007 | Bergholz et al. | 707/3 |
| 2007/0239710 A1* | 10/2007 | Jing et al. | 707/6 |
| 2008/0016087 A1* | 1/2008 | Zhang et al. | 707/100 |
| 2009/0063500 A1* | 3/2009 | Zhai et al. | 707/10 |
| 2009/0199099 A1* | 8/2009 | Girgensohn et al. | 715/719 |
| 2010/0030752 A1 | 2/2010 | Goldentouch | |
| 2010/0049772 A1* | 2/2010 | Jing et al. | 707/776 |
| 2010/0241639 A1* | 9/2010 | Kifer et al. | 707/754 |
| 2010/0328352 A1* | 12/2010 | Shamir et al. | 715/764 |
| 2012/0124077 A1* | 5/2012 | Song et al. | 707/769 |
| 2012/0254251 A1* | 10/2012 | Barbosa et al. | 707/797 |

OTHER PUBLICATIONS

Davi de Castro Reis, Paulo B. Golgher, Altigran S. da Silva, and Alberto H. F. Laender—"Automatic Web News Extraction Using Tree Edit Distance"—Proceeding WWW '04 Proceedings of the 13th international conference on World Wide Web—May 17-22, 2004—(pp. 502-511).*

Anupam Bhattacharjee and Hasan Jamil—"OntoMatch: A Monotonically Improving Schema Matching System for Autonomous Data Integration"—Research supported in part by National Science Foundation —IEEE IRI 2009, Jul. 10-12, 2009, Las Vegas, Nevada, USA—(pp. 318-323).*

Nitin Jindal, and Liu Bing. The SIAM International Conference on Data Mining (2010) "A Generalized Tree Matching Algorithm Considering Nested Lists for Web Data Extraction" (pp. 930-941).*

(Continued)

*Primary Examiner* — Anh Ly (57) ABSTRACT

Systems and methods of mining Web applications are disclosed. An example method may include selecting a distance measure between subtrees of the Web applications. The method may also include computing an edit distance for the subtrees. The method may also include finding sets of similar subtrees using the edit distance with a Similar Sibling-Trees-aware RTDM (SiSTeR) approach.

18 Claims, 6 Drawing Sheets

(56) References Cited

OTHER PUBLICATIONS

Bing Liu and Yanhong Zhai—"Web Data Extraction Based on Partial Tree Alignment" WWW 2005 May 10-14, 2005 (pp. 1-10).*
Ke Wang, Yu, P.S. and Chakraborty, S.—"Bottom-up generalization: a data mining solution to privacy protection"—Data Mining, 2004. ICDM '04. Fourth IEEE International Conference on—Nov. 1-4, 2004 pp. 249-256 ISBN: 0-7695-2142-8 INSPEC & 8411512.*
Yijun Bei, Gang Chen, Lidan Shou, Xiaoyan Li and Jinxiang Dong—"Bottom-up discovery of frequent rooted unordered subtrees"—Information Sciences vol. 179, Issues 1-2, Jan. 2, 2009, pp. 70-88.*
Davi De Castro Reis; Paulo B. Golgher; Altigran S. Da Silva; Alberto H. F. Laender; Automatic Web News Extraction Using Tree Edit Distance; http://portal.acm.org/citation.cfm?id=988740 > Publication Date: May 17-22, 2004; On pp. 502-511.
Lei Shi; Cheng Niu; Ming Zhou; Jianfeng Gao; a Dom Tree Alignment Model for Mining Parallel Data from the Web; http://research.microsoft.com/en-us/um/people/jfgao/paper/treeAlignment-ACL2006-camera-version.pdf.

* cited by examiner

MINING WEB APPLICATIONS

BACKGROUND

There is a growing interest in discovering knowledge from complex data which is organized as trees, rather than as a single relational table. Example applications include, but are not limited to, manipulating molecular data, XML data and Web content. By way of illustration, modern web applications often include content that is automatically generated using templates, whose content is filled from databases, or web toolkits. Such HTML documents can be very complex. For example, a search page presents a simple form that a user perceives as a few interface objects. But that search page may actually include a hundred or more objects. While automatically generated content tends to be complex, this type of content also tends to be consistent. Thus, the same functional components tend to have a similar Document Object Model (DOM) structure.

The importance of recognizing repeating structures in web applications has generated a large body of work on algorithms for mining the HTML Document Object Model (DOM). It has been recognized that HTML documents form trees, and a tree "edit distance" constitutes a good similarity measure between DOM structures. Consider, however, looking for patterns that form subtrees within a web page with many elements. The operations must be computed for all subtrees, and the execution time magnitudes of order higher. Considering the quantity of data in HTML, the size of the DOM for modern web applications, and the need for interactive pattern discovery, computation time remains an issue.

DETAILED DESCRIPTION

Briefly, the systems and methods disclosed herein utilize an algorithm for finding frequent trees which are similar, but not necessarily identical. The algorithms are described in detail and proven in co-owned, co-pending U.S. patent application Ser. No. 12/916,501, hereby incorporated by reference as though fully set forth herein. Accordingly, the algorithms are described at a higher level herein for purposes of clarity.

An example of the algorithm computes the RTDM in a data mining setting, by computing the distance between all subtrees in a tree in time $O(n^2)$, which enables better quality results, in addition to better performance, on a DOM mining task. In addition, a tree edit-distance referred to as Similar Sibling Trees aware RTDM (SiSTeR), allows repetitious (very similar) subtrees of different quantity to appear in two trees which are supposed to be considered as similar. For example, the SiSTeR measure allows the detection of two lists of different length (e.g., search result) as similar, disregarding the number of entries within each one individually. These and other examples will be described in more detail below.

Applications of the RTDM and SiSTeR algorithms are described herein as implemented in systems and methods for mining Web applications, and in a particular example, for HTML Document Object Model (DOM) mining operations. Example applications include DOM structure mining, and DOM structure search.

Before continuing, it is noted that as used herein, the terms "includes" and "including" mean, but is not limited to, "includes" or "including" and "includes at least" or "including at least." The term "based on" means "based on" and "based at least in part on."

Figure 1:
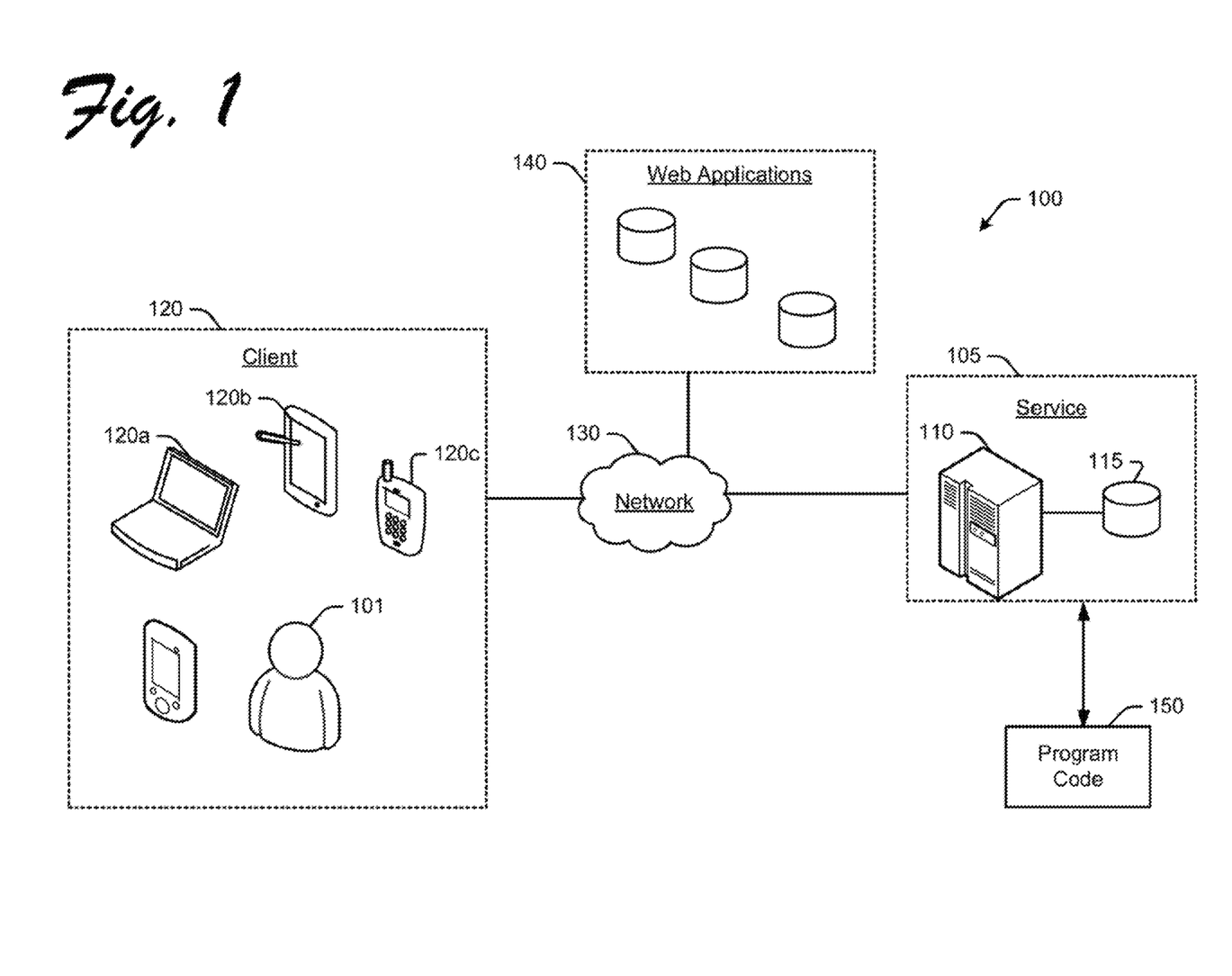
FIG. 1 is a high-level illustration of an example networked computer system which may be implemented for mining Web applications.

FIG. 1 is a high-level block diagram of an example networked computer system which may be implemented for mining web applications. System 100 may be implemented with any of a wide variety of computing devices. The computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a service 105 accessed by a user 101 via a client device 120. The service 105 may be an online data mining service executing on a host 110 configured as a server computer with computer-readable storage 115. The client 120 may be any suitable computer or computing device 120a-c capable of accessing the host 110. Host 110 and client 120 are not limited to any particular type of devices. The system 100 may also include a communication network 130. The host 110 and client 120 may be provided on the network 130 via a communication connection, such as via an Internet service provider (ISP). In this regard, the client 120 is able to access host 110 directly via the network 130, or via an agent, such as another network.

The service 105 may include interfaces to application programming interfaces (APIs) and related support infrastructure, such as search engines and hosted business services (e.g., online retailers). During operation, the service 105 may mine web applications 140. Example web applications 140 may include commercial, government, and other sources of data hosted on the Internet or as dynamic data endpoints for any number of client applications. The web applications 140 may include any of a wide variety of content. There is no limit to the type or amount of content that may be provided by the web applications. In addition, the content may include unprocessed or "raw" data, or the content may undergo at least some level of processing.

Program code 150 may be executed by any suitable computing device to mine the web applications for the client 120. In an example, the program code may be implemented in machine-readable instructions (such as, but not limited to, software). The machine-readable instructions may be stored on a non-transient computer readable medium and are executable by one or more processor to perform the operations described herein. The program code may execute the function of the architecture of machine readable instructions as self-contained modules. These modules can be integrated within a self-standing tool, or may be implemented as agents that run on top of an existing program code. However, the operations described herein are not limited to any specific implementation with any particular type of program code.

Before continuing, it should be noted that the examples described above are provided for purposes of illustration, and are not intended to be limiting. Other devices and/or device configurations may be utilized to carry out the operations described herein.

The program code may execute instructions for mining algorithms. In an example, the algorithms may mine the HTML Document Object Model (DOM). Mining algorithms are often used to search for repeating subtree structures in an input collection of trees. These algorithms vary in the restrictions that the repeating structure adhere to, and in the type of trees that are searched, in order to be considered similar. The most restrictive and efficient algorithms search for bottom-up subtrees in ordered, labeled trees. A bottom-up subtree at a node includes the node and all its descendants. Another type of subtree of interest is an induced subtree, in which "leaves" of the tree may be repeatedly removed.

For DOM structure mining, there is a particular tree mining scenario of interest. That is, the trees are rooted, labeled and ordered. The interesting part of the pattern is the leaves. While initial thoughts would lead one to use a bottom-up approach, the patterns being sought are similar, but not identical. Therefore, a better notion of tree distance for mining the web is to use a top-down edit distance. A top-down edit distance restricts insertions and deletions to the leaves of the trees. A variant of this definition, the restricted top-down distance, is even more suitable for web mining, because it captures the process of building web pages.

The setting of DOM mining prescribes the type of trees we are working with. The repeating subtrees may include the actual content of the Web page. The internal nodes are often a collection of DIV and SPAN elements that can be aligned fortuitously. Thus, the subtrees are bottom-up in principle, but small differences between trees are acceptable. For example, consider a set of search results, which have similar, but not identical formats (e.g., some have an additional link to a PDF document, and the others do not). The acceptable differences, or edit operations, are also restricted.

Therefore, the prevalent notion of edit distance does not match our intuition about the differences between HTML structures. For example, consider a complex control, such as a calendar control. This control may form a rather large tree in the DOM. Now consider embedding this control in an HTML page. That is, the entire DOM tree for the control may be inserted into a container element with some heading. Now consider the data mining scenario in which we want to identify the calendar control. The edit distance between the control and the control which is embedded in the container is very small. That is, it is quite difficult to isolate the control from the container. This distinction is enabled by the Restricted Top-Down edit Metric (RTDM), because of the restrictions placed on the permitted edit operations.

The algorithm described herein computes the RTDM distances between all subtrees in the first tree and all subtrees in the second tree, in time $O(n1 \cdot n2)$. The algorithm uses dynamic programming. But unlike prior techniques, the algorithm computes the edit distance in a bottom-up manner, starting at the leaves and progressing up the nodes of the tree. The approach computes, for each pair of nodes, the distances between the subtrees rooted at these nodes. The algorithm traverses the trees only once, resulting in improved running time. To find the repeating subtrees in a single input tree with this algorithm takes time $O(n^2)$, rather than $O(n^4)$. For data mining applications, the improvement in execution times can be significant.

Also disclosed is a variant of the RTDM algorithm (referred to herein as SiSTeR). This variant considers two trees to be similar, even when the trees differ with regard to the number of similar sibling subtrees. For example, consider a citation on an article site. Each entry has a "Cited by" section. Although the subtree may have a different number of child-subtrees for each article (the citations), two "Cited by" subtrees are still considered to be similar.

Before explaining the details of these algorithms, it is useful to consider the underlying infrastructure. In the following examples, we consider rooted-ordered-labeled trees. A tree is a cycle-free connected undirected graph. A rooted tree is a tree in which a particular node is distinguished from the others and called the root. For any couple of nodes (v), if a node (u) is on the single path from the couple of nodes (v) to the root, then that node (u) is an ancestor of the couple of nodes (v), and the couple of nodes (v) is a descendant of the node (u). A rooted ordered tree is a rooted tree in which for every vertex, the set of the nodes' children is an ordered set, so we can refer to a child as the first child, second child, etc. A labeled tree is a tree (T) with the addition of a node-labeling function (L) having a set of possible labels (Lab).

Within this framework, some manipulation are allowed on trees. The allowed edit operations are somewhat different than that of standard operations. The operations allowed in this framework include delete, insert, and replace for subtrees.

Figure 2:
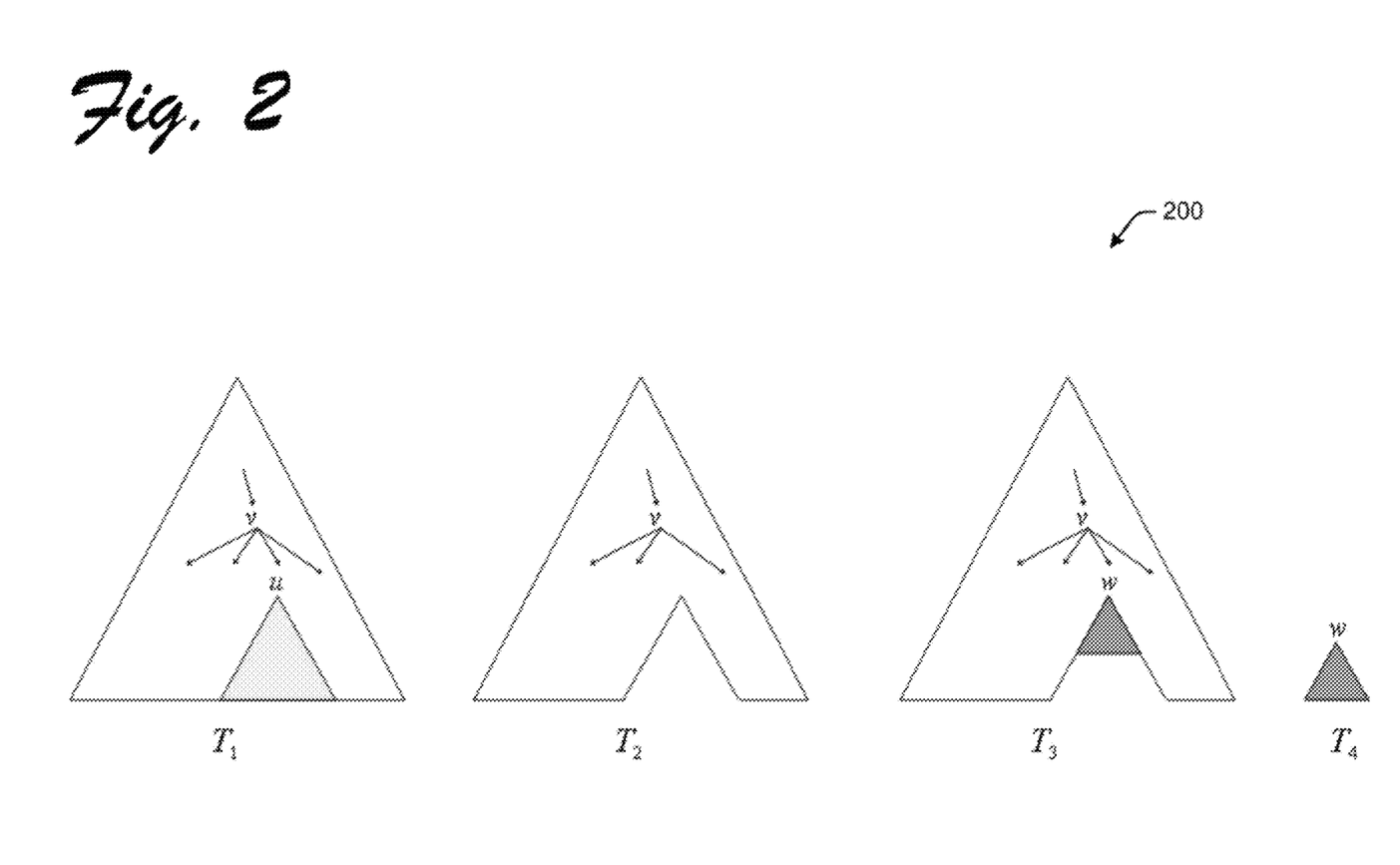
FIG. 2 shows an illustration of example edit operations.

FIG. 2 shows an illustration 200 of these edit operations. For two trees $T_1=(V_1, E_1, L_1)$ and $T_2=(V_2, E_2, L_2)$ and two vertices $v_1 \in V_1$ and $v_2 \in V_1$ the replace operation is defined by $T_1(T_1(v_1) \rightarrow T_2(v_2))$ to be the tree $T_1$, when taking out the subtree $T_1(v_1)$ and replacing it with the subtree $T_2(v_2)$, where the order of $v_2$ as a child is the same order that $v_1$ had and the labels given by $L_2$ remain $(T_1(v_1) \rightarrow T_2(v_2)$, for short). The delete operation is defined to be $T_1(v_1) \rightarrow \lambda$, where $\lambda$ is the empty graph tree. The insert operation is defined to be $\lambda \rightarrow T_2(v_2)$.

We also define a sequence of edit operations $S=s_1, \ldots, s_k$. The S-derivation of $T_1$ is defined to be the sequence of trees accepted by $T_1(s_1)(s_2) \ldots (s_k)$. If the resulting tree is $T_2$ then S is a derivation S from $T_1$ to $T_2$ and is denoted by $T_1 \rightarrow T_2$.

A cost function ($\gamma$) is defined to assign a real number to each edit operation. This cost function is constrained in this framework to be a distance metric cost for a sequence (S), and the edit distance between two trees $T_1$ and $T_2$ is then the lowest-cost S-derivation from $T_1$ to $T_2$.

In order to proceed, the definition is broadened to (directed-ordered-labeled) forests. A forest is a set of trees. The forests of interest are ordered forests, which means that the set of trees is ordered. All definitions generalize naturally from trees to forests (including those of S-derivation, γ, and D, although the operations are still only defined for a single connected tree at a time).

Given a tree T=(V, E, L), for any v ∈ V denote F (v) to be the forest which consists all the subtrees of T with the children of v as their roots, with the order of the trees in the forest remains as the order of their roots as children of v. For every tree, if changes are within a subtree S, then one can assume no operation is performed on any subtree that is not included in S. This is implied by the nature of the operations allowed: any operation on a subtree not including S is redundant, and any operation on a subtree including S can be replaced by an operation on S.

The operations allowed cannot change the number of connected components (trees) of a forest. In addition, each single operation is performed on a single tree in the forest. Thus, the mapping which is induced by the edit distance computation of two forests consists, by definition, of a bi-partite matching between the trees comprising the forest. Moreover, as the two forests are ordered the bi-partite matching does not consists of crossing edges.

The edit distance then follows immediately by considering the three possible cases of whether the first trees in both forest are matched in the bi-partite match. If they both do, then they match to each other. Whereas prior top-down edit distance metrics are defined as operations on nodes (or leaves), we define the edit distance in terms of operations on subtrees. Nonetheless, this definition differs from the top-down edit distance definition only in the re-label operation, and it is identical to RTDM.

Having selected the distance measure between the subtrees, we next want to cluster like subtrees together. Like other data mining applications, a suitable clustering algorithm must be efficient in both time and space. For such applications, agglomerative hierarchical clustering is typically selected. This approach to clustering begins with every object as a separate cluster and repeatedly merges clusters. We use a mode finding clustering approach. This approach has good space and time performance because it uses neighbor lists, rather than a complete distance matrix. Neighbor lists are determined based on a distance threshold θ. The running time and memory requirement for the algorithm is O(N×average ($|\eta'|$)), where N is the number of objects to cluster and θ is the neighbor list of object i. We expect the neighbor lists to be small and independent of N.

To compute the edit distance of every pair of subtrees in two input trees, a dynamic programming approach may be implemented, referred to herein as an All-Subtree Edit Distance Algorithm. Prior algorithms begin at the root of the tree and follow the structure of the tree down. The algorithm used herein, on the other hand, uses a bottom-up approach. The challenge in the bottom up approach is that we do not know which subtrees to match. Therefore, we match all subtrees to each other, which forms the basis of the all-subtree computation. As the computation moves up the tree, the constraints due to tree structure are enforced.

To compute the edit distance we consider, for any vertex in the tree T, the subtree rooted at this vertex as a reversed pre-order sequence of vertices. The algorithm for finding sets of subtrees is defined such that each set contains a number of subtrees which are similar to each other. Thus, the output is a meaningful clustering of bottom-up subtrees, in which the similarity measure is the RTDM.

Given the input tree, the following may be performed: 1) Run the All-Subtree Edit Distance Algorithm to obtain the distance matrix between every two subtrees in the input tree. 2) Based on the computed distance matrix, cluster the subtrees according to some clustering algorithm. 3) Using configured thresholds, output the significant clusters. The output can be given as a list of cluster representatives and the cluster's radius.

In the above algorithm, clustering uses a threshold on distance, which is application specific. The conditions that determine significant clusters may also depend on the application. For example, clusters might be required to comprise a minimum number of repetitions, or a maximal number of repetitions. Other conditions for significant clusters may depend on the size of the structures, the quantity of significant elements within the constructs (e.g., in web pages, elements which are not DIV or SPAN).

For practical data mining applications, the Frequent Similar Trees algorithm may be implemented in a manner that supports an online setting. In such a setting, a user might browse the Internet or "Web." Each time the user approaches a new page, the DOM tree of this new page is added to the analysis. The edit distances are computed for the subtrees in the current tree, in addition to the subtrees in prior trees.

Space is conserved by storing neighbor lists, rather than the complete distance matrix. The existing clustering is updated using the stored neighbor lists, thereby, creating new clusters and adding new members to existing clusters. This method is sensitive to the browsing order, but has the benefit of being efficient. The main constructs in a website are not too sensitive to that order.

In another example, a variant of RTDM is also compatible with DOM applications, and can be plugged into the All-Subtree-Algorithm. The Similar Sibling-Trees-aware RTDM (SiSTeR) is a variant in which multiple subtrees are handled as a set regardless of number. In many websites, sibling subtrees might be very similar, and do not impact similarity to other trees. Forum threads are a good example. In forums, the number of posts in a thread should not influence the similarity to other threads.

SiSTeR includes two additional operations to the standard edit operations: (1) one-to-many-replace and (2) many-to-one-replace. The semantics of these operations allows a series of consecutive replaces of one subtree with many subtrees (rather than replace, followed by a row of inserts or deletes using the RTDM technique). For these operations, the cost is defined to be the sum of the many replaces that occurred. Note that the replace operation is a private case of many-to-one-replace and one-to-many-replace.

By way of illustration, strings allows a distance 0 between the string a and the string aaaaa, unlike the standard edit-distance which requires 4 insert-operations. Here a one-to-many-replace operation with cost 0 for each of the replace operation allows the "similar-sibling awareness". For trees one can see the importance of the two operations in FIG. 3.

Figure 3:
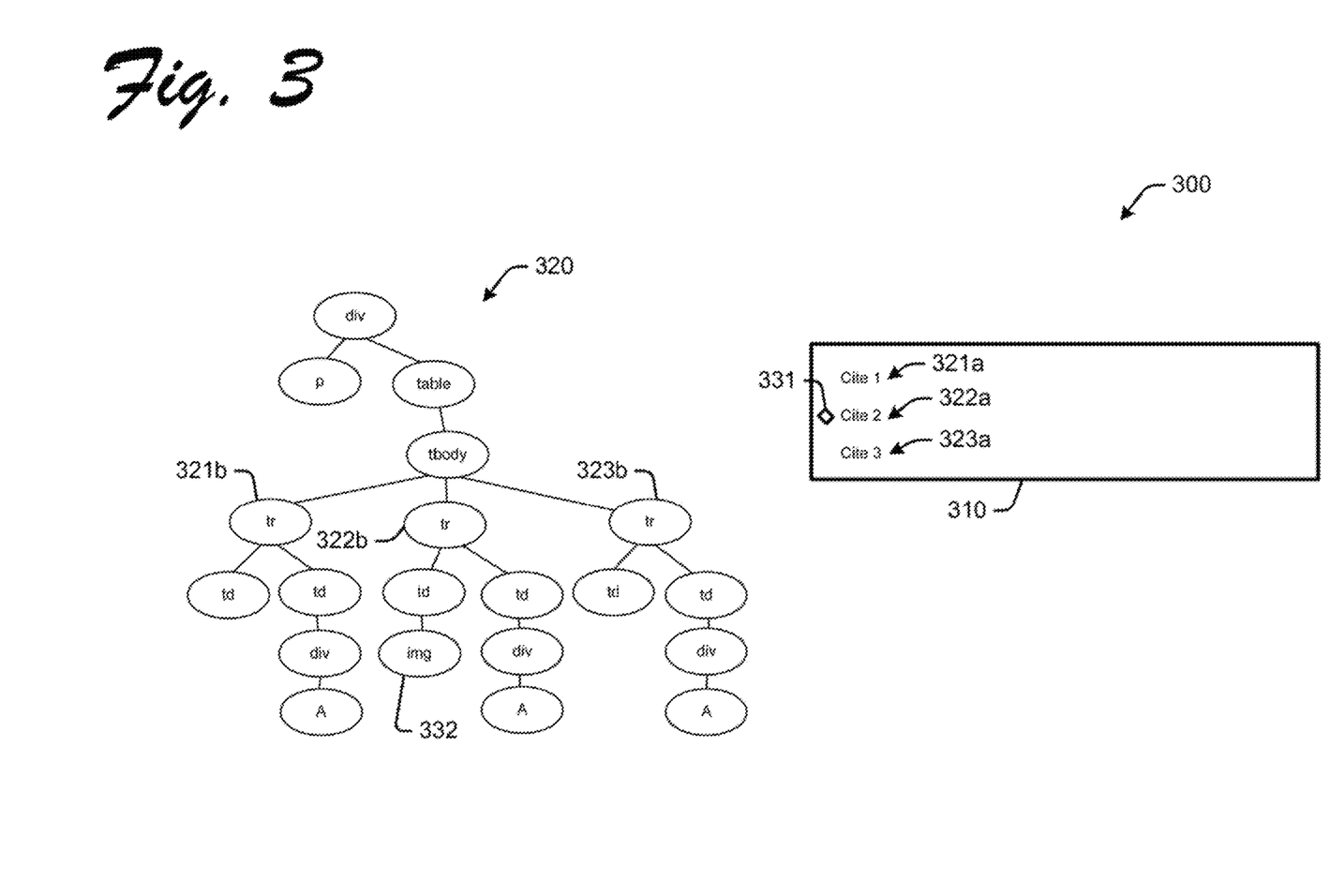
FIG. 3 shows an illustration of operations on a page within a web site.

In FIG. 3, a page 300 is shown within a web site. The rectangle 310 is the section whose subtree 320 is presented.

Note that as there are three "Cited by" entries 321a-323a, there are also three "TR" nodes 321b-323b. Also notice that the subtrees are not exactly the same. The middle "Cited by" entry 322a has an icon 331 and therefore includes an "img" node 332 in its subtree 322b. Consider a different page with only one "Cited by" entry (e.g., without an icon). The standard RTDM distance would then be large because there are two subtrees with five to six nodes each difference between the "Cited by" subtrees. Nevertheless, the SiSTeR metric allows a many-to-one-replace with cost one (only the "img" node should be payed for in the replace of its subtree).

It can be seen by this example, that two pages of two different papers have different number of "Cited by" entries. Yet, this number is not relevant for the decision whether the two subtrees are similar.

We denote the SiSTeR edit distance by D' and have the following version of Lemma 1:

For any two trees $T_1 = (V_1, E_1.L_1)$ and $T_2 = (V_2, E_2, L_2)$ and two vertices within $v_1 \in V_1$ and $v_2 \in V_2$ it holds that:

$$D'(\mathcal{T}_1(v_1), \lambda) = \gamma(\mathcal{T}_1(c_1) - \lambda)$$

$$D'(\lambda, \mathcal{T}_2(v_2)) = \gamma(\lambda - \mathcal{T}_2(v_2))$$

$$D'(\mathcal{T}_1(v_1), \mathcal{T}_2(v_2)) = \begin{cases} \gamma(\mathcal{T}_1(v_1) - \mathcal{T}_2(v_2)) & L_1(v_1) \neq L_2(v_2) \\ D(\mathcal{F}_1(v_1), \mathcal{F}_2(v_2)) & \text{otherwise} \end{cases}$$

where, the distance between two forests is defined as follows. For $h \in \{1, 2\}$ let $\mathcal{F}_h$ be a forest whose roots are $c_h^1, c_h^2 \ldots c_h^{t_h}$, for each $h$ denote by $\mathcal{F}_h^{j-}$ the forrest whose roots are $c_h^j \ldots c_h^{t_h}$, and let us denote $$D'(\mathcal{F}_1^{i-}, \mathcal{F}_2^{j-}) = D'(\langle \mathcal{T}_1(c_1^i), \ldots \mathcal{T}_1(v_1^{\ell_1}) \rangle \cdot \langle \mathcal{T}_2(r_2^j) \ldots \mathcal{T}_2(v_2^{\ell_2}) \rangle).$$

$$D^{OTM}(\mathcal{F}_1, \mathcal{F}_2^{j-}) = \min_{\ell} \left\{ \sum_{k=j}^{\ell} D'(\mathcal{T}_1(v_1^1), \mathcal{T}_2(v_2^k)) + D'(\mathcal{F}_1^{2-}, \mathcal{F}_2^{\ell+1-}) \right\}, \text{ and}$$

$$D^{MTO}(\mathcal{F}_1^{i-}, \mathcal{F}_2) = \min_{\ell} \left\{ \sum_{k=i}^{\ell} D'(\mathcal{T}_1(v_1^k), \mathcal{T}_2(v_2^1)) + D'(\mathcal{F}_1^{\ell+1-}, \mathcal{F}_2^{2-}) \right\},$$

then $D'(\mathcal{F}_1, \lambda) = \sum_{k=1}^{\ell_1} \gamma(\mathcal{T}_1(v_1^k) - \lambda)$ $$D'(\lambda, \mathcal{F}_2) = \sum_{k=1}^{\ell_2} \gamma(\lambda - \mathcal{T}_2(v_2^k))$$

$$D'(\mathcal{F}_1, \mathcal{F}_2) = \min \begin{cases} \gamma(\mathcal{T}_1(v_1^1) - \lambda) + D'(\mathcal{F}_1^{2-}, \mathcal{F}_2) \\ \gamma(\lambda - \mathcal{T}_2(v_2^1)) + D'(\mathcal{F}_1, \mathcal{F}_2^{2-})) \\ D^{OTM}(1) \\ D^{MTO}(1) \end{cases}$$

The proof here is by definition, whenever one deletes a subtree (alternatively, inserts a subtree), one can either pay for a delete (alt. insert) operation as in the first (alt. second) alternative within the minimum, or pay for the one-to-many-replace (alt. many-to-one-replace) operation as in the third (alt. fourth) alternative. The choice will be by definition the minimum between these four alternatives.

The following lemma is for devising a method for calculating D' within our dynamic programming scheme:

$$D^{OTM}(\mathcal{F}_1, \mathcal{F}_2^{1-}) =$$

$$D'(\mathcal{T}_1(v_1^1), \mathcal{T}_2(v_2^1)) + \min\{D'(\mathcal{F}_1^{2-}, \mathcal{F}_2^{2-}), D^{OTM}(\mathcal{F}_1, \mathcal{F}_2^{2-})\}$$

$$D^{MTO}(\mathcal{F}_1^{1-}, \mathcal{F}_2) = D'(\mathcal{T}_1(v_1^1), \mathcal{T}_2(v_2^1)) +$$

$$\min\{D'(\mathcal{F}_1^{2-}, \mathcal{F}_2^{2-}), D^{MTO}(\mathcal{F}_1^{2-}, \mathcal{F}_2)\}$$

Proof $$D^{OTM}(\mathcal{F}_1, \mathcal{F}_2^{1-}) = \min_{\ell \geq 1} \left\{ \sum_{k=1}^{\ell} D'(\mathcal{T}_1(v_1^1), \mathcal{T}_2(v_2^k)) + D'(\mathcal{F}_1^{2-}, \mathcal{F}_2^{\ell+1-}) \right\}$$

$$= \min \begin{cases} D'(\mathcal{T}_1(v_1^1), \mathcal{T}_2(v_2^1)) + D'(\mathcal{F}_1^{2-}, \mathcal{F}_2^{2-}) \\ \min_{\ell \geq 2} \left\{ \sum_{k=1}^{\ell} D'(\mathcal{T}_1(v_1^1), \mathcal{T}_2(v_2^k)) + D'\left(\begin{matrix}\mathcal{F}_1^{2-}, \\ \mathcal{F}_2^{\ell+1-}\end{matrix}\right) \right\} \end{cases}$$

$$= \min \begin{cases} D'(\mathcal{T}_1(v_1^1), \mathcal{T}_2(v_2^1)) + D'(\mathcal{F}_1^{2-}, \mathcal{F}_2^{2-}) \\ \min_{\ell \geq 2} \begin{cases} D'(\mathcal{T}_1(v_1^1), \mathcal{T}_2(v_2^1)) + \sum_{k=2}^{\ell} \\ D'(\mathcal{T}_1(v_1^1), \mathcal{T}_2(v_2^k)) + \\ D'(\mathcal{F}_1^{2-}, \mathcal{F}_2^{\ell+1-}) \end{cases} \end{cases}$$

$$= \min \begin{cases} D'(\mathcal{T}_1(v_1^1), \mathcal{T}_2(v_2^1)) + D'(\mathcal{F}_1^{2-}, \mathcal{F}_2^{2-}) \\ D'(\mathcal{T}_1(v_1^1), \mathcal{T}_2(v_2^1)) + \\ \min_{\ell \geq 2} \left\{ \sum_{k=2}^{\ell} D'(\mathcal{T}_1(v_1^1), \mathcal{T}_2(v_2^k)) + D'\left(\begin{matrix}\mathcal{F}_1^{2-}, \\ \mathcal{F}_2^{\ell+1-}\end{matrix}\right) \right\} \end{cases}$$

$$= \min \begin{cases} D'(\mathcal{T}_1(v_1^1), \mathcal{T}_2(v_2^1)) + D'(\mathcal{F}_1^{2-}, \mathcal{F}_2^{2-}) \\ D'(\mathcal{T}_1(v_1^1), \mathcal{T}_2(v_2^1)) + D^{OTM}(\mathcal{F}_1, \mathcal{F}_2^{2-}) \end{cases}$$

$$= D'(\mathcal{T}_1(v_1^1), \mathcal{T}_2(v_2^1)) + \min \begin{cases} D'(\mathcal{F}_1^{2-}, \mathcal{F}_2^{2-}), \\ D^{OTM}\left(\begin{matrix}\mathcal{F}_1^{2-}, \\ \mathcal{F}_2^{2-}\end{matrix}\right) \end{cases}$$

The second part of the lemma is proved in a similar way. We revised the all-subtree distance algorithm to use SiSTeR in the most straight-forward way. In addition, we also calculate:

$$i, j > 0 \; M_{OTM}(i, j) = M_V(i, j) + \min \begin{cases} M_F(l_\perp(i), l_2(j)) \\ M_{OTM}(i, l_2(j)) \end{cases}$$

$$i, j > 0 \; M_{MTO}(i, j) = M_V(i, j) + \min \begin{cases} M_F(l_1(i), l_2(j)) \\ M_{MTO}(l_1(i), j) \end{cases}$$

$$i, j > 0 \; M_F(i, j) = \min \begin{cases} M_V(i, 0) + M_F(l_1(i), j) \\ M_V(0, j) + M_F(i, l_2(j)) \\ M_{MTO}(i, j) \\ M_{OTM}(i, j) \end{cases}$$

Note that the calculation of the value of the matrices in the location (i, j) requires the value of $M_{MTO}$ and $M_{OTM}$ in the locations (i, j), (i, I$_2$(j)) and $M_{MTO}$ (I$_1$ (i), j). We may order the dynamic procedure so that it calculates first the first row and column of the matrices, then the second and so on. This means that instead of using n1·n2 space for the auxiliary matrices we may use only O(n1+n2) space for keeping only one row and column at any given time.

Having described an overview of the SiSTeR technique, the following describes applications in DOM mining. In the first example, DOM Structure Mining, the ability to efficiently find repeating structure in trees can be used for mining Web applications. That is, several classes of constructs common to Web applications manifest as repeating DOM structures, including controls, records and containers.

The first construct, controls, are user-interface components, which provide a desirable functionality. Example controls include, but are not limited to a calendar control and the video control used by online video websites. The DOM structure of controls is often identical.

The second construct, records, display information to the user. For example, records display search results in search engines, items for purchase and the content of a shopping cart at online commerce sites, and videos at online video sites, to name only a few examples. The DOM structures of records are not typically identical, but do contain a lot of common structure.

The third control, containers, display loosely related information to the user. The Videos Being Watched Now, Featured Videos and Most Popular Videos, used at online video sites are examples of containers. Portlets are also a common type of container. Containers typically have a similar structure in the header, but very different structure in the content.

Figure 4:
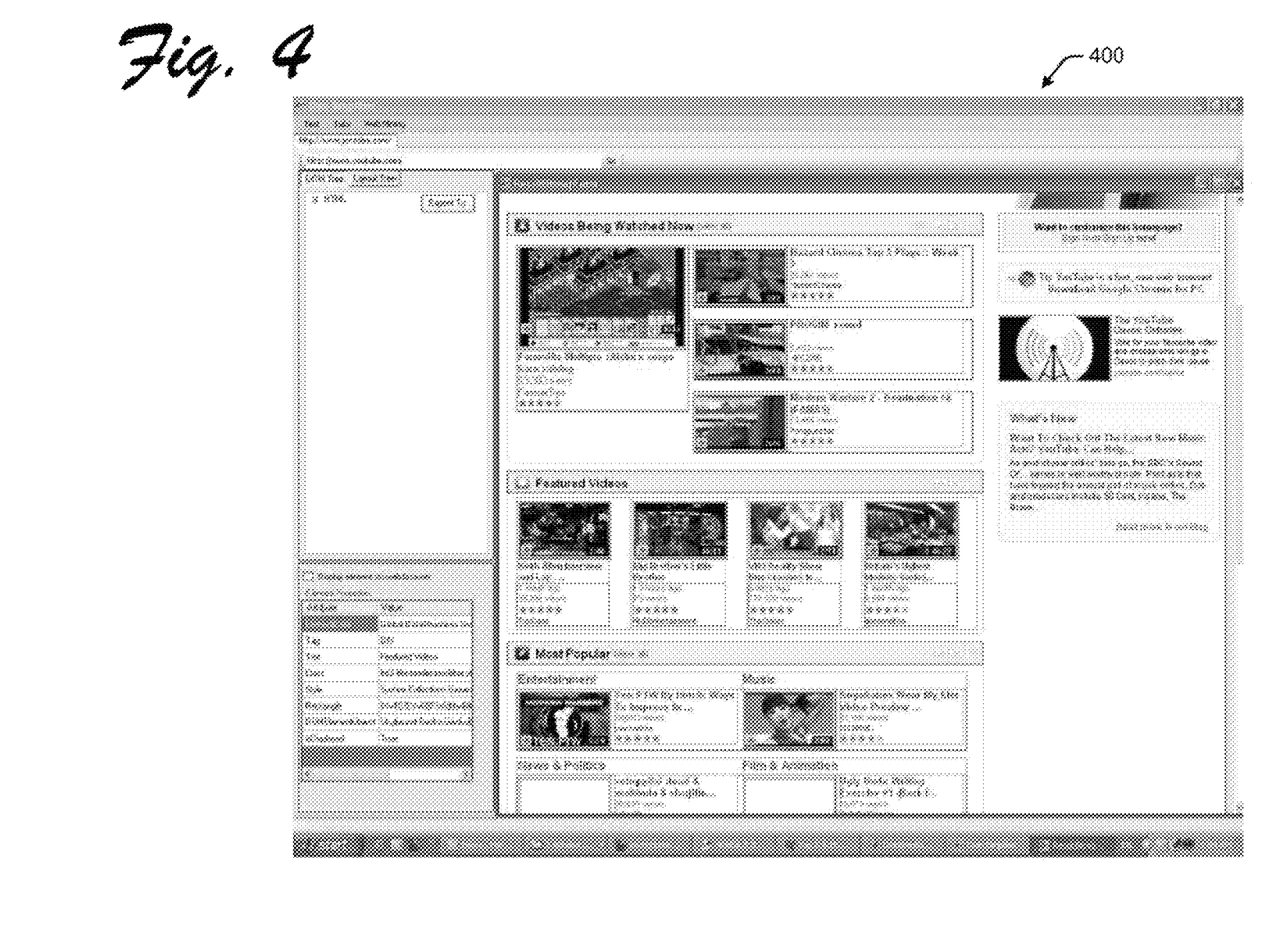
FIG. 4 demonstrates that the algorithms described herein can be used in an application to find different types of structures.

Often heuristics, such as examining sibling structures, have been used to make the search efficient. The algorithm described herein operates without heuristics. FIG. 4 demonstrates that the algorithm can be used to find all three types of structures on a web page 400. Controls can be found when the distance between the entire cluster of subtrees is 0. The algorithm can find these repeating structures anywhere in the page, or on a number of pages.

Records can be found by allowing clusters with some dissimilarity. In an example, a distance threshold of 20% of the combined length of the subtrees is used. A useful post-processing phase adds to pattern clusters any structures that may be less similar structurally to the pattern cluster (e.g., a 40% distance), but are siblings of structures in the cluster and are also aligned to each other. In addition, sometimes records are cluttered with DOM tags, which can be filtered out to reduce unimportant differences between records.

Containers are the most difficult to identify. Although, the algorithm can often find containers using a higher distance threshold (e.g., 60% of the subtree sizes), another approach for finding containers is to use headers. For example, the container may be identified from the header. FIG. 4, for which we used a threshold of 20% shows that the container's headers are clustered together. Another example may combine information from headers and complete subtrees to find containers.

In another example, the All-Subtree Edit Distance algorithm is also applicable to the problem of searching the web for a predefined DOM structure. In this use case, the user, or an application, seeks a known DOM structure (e.g., a pattern) in a collection of web pages. However, the pattern may be inexact. Example Web applications which may benefit from efficient search for inexact patterns include, but are not limited to, mashups, article extraction, and web automation.

To find all similar occurrences of a pattern on a web page, the All-Subtree Edit distance algorithm is executed with the DOM tree, Tpg, and the DOM tree representing the pattern, Tpat, as input. The distance of all the subtrees with the input pattern are computed as the edit distance from the node to the root of the pattern. A similarity threshold may be used to return the desired search results. The time for this algorithm is $O(n \cdot k)$, where n is the size of the page and k is the size of the pattern. Assuming that the size of the pattern is small and independent of n, the algorithm is linear in the size of the input tree.

It is noted that there exists synergy between the DOM structure mining application and the DOM structure search application. Structure mining may be used to find repeating structures. For each repeating structure, the Frequent Similar Trees algorithm outputs a representative pattern and similarity measure. This information may, in turn, be used to search for similar structures on other pages.

The edit distance algorithm was developed for mining DOM structures, and thus was evaluated on a variety of Web components. In an example, components taken from several Web pages were tested. The test attempted to capture several different types of structures. In the video page, clip controls were selected which were all structurally identical. The search engine and ecommerce pages show search results. It is evident from these different types of Web applications, that the results are also very different. Thus, grouping these search results is a challenge in this domain. For example, the different types of containers have a similar structure at the top level, but completely different content, which also makes these difficult to group.

For the test, several objects from each page were selected. The distance was computed from each object to every other object, using both the RTDM and the tree edit distance algorithms. A subset of the objects from each page were analyzed, which illustrate the behavior of the algorithms. The distances were normalized by the combined sizes of the two objects, so that the distance was between 0 and 1.

Figure 5:
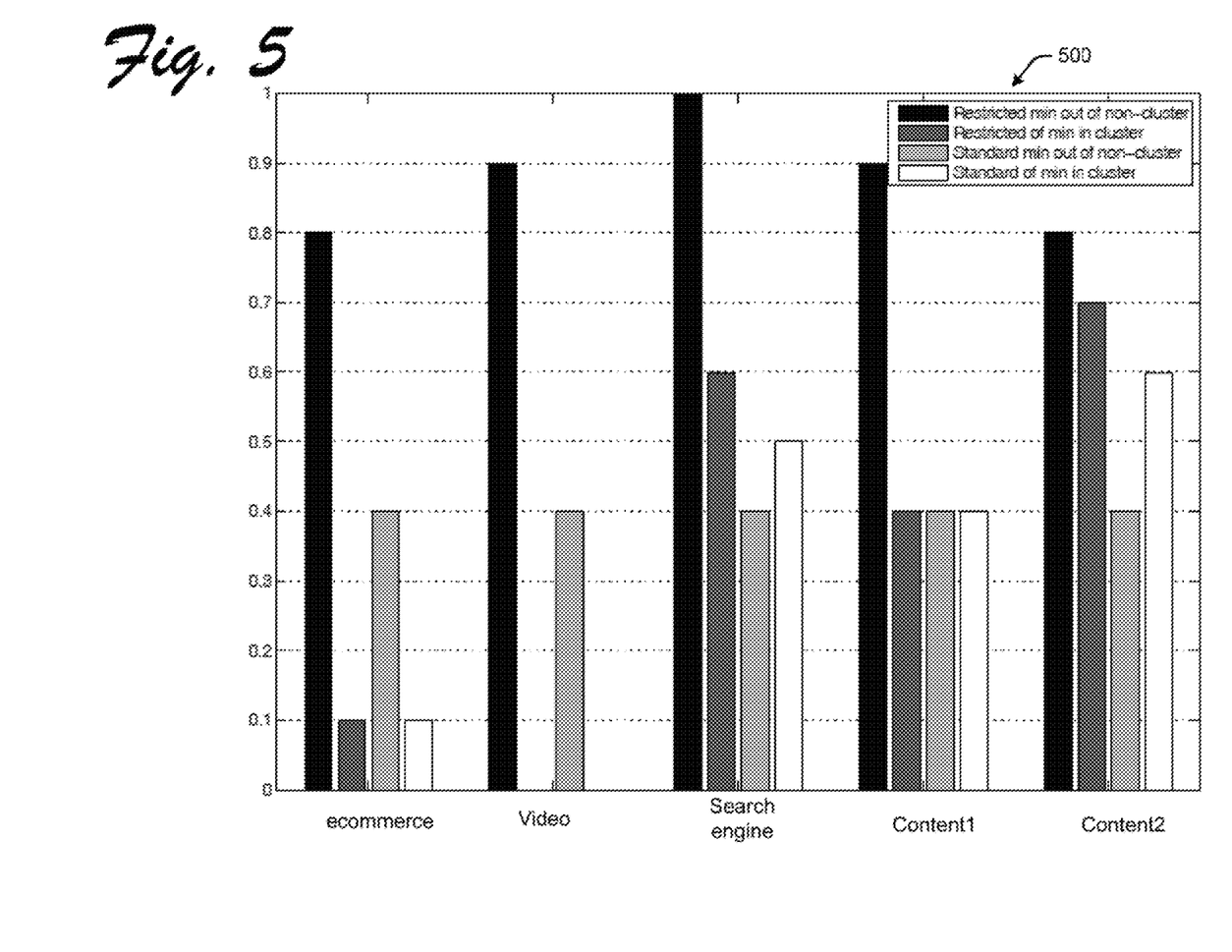
FIG. 5 summarizes results of a test of the algorithm.

FIG. 5 is a plot 500 summarizing results of the test. In plot 500, the quality of the standard edit distance algorithm was compared with RTDM as with regards to similar DOM trees. For each of the edit-distance measures, and for each of the five clusters of trees, the maximal distance of a cluster member was compated to the cluster to the minimal distance of a non-cluster member to the cluster (the most distracting element for this cluster). As the graph exhibits, for RTDM there exists a threshold (in this case 0.65), which distinguishes between cluster and non-cluster members. No such threshold can be set for the standard algorithm.

Before continuing, it is noted that the algorithms described herein are highly efficient for use in mining a tree (or forest), and finding sets of subtrees that are similar to one other. The algorithm may be used as described above to mine web pages, and thus, uses a tree edit distance that is appropriate for this application (i.e., the RTDM). For cases where multiple sibling subtrees might appear, the SiSTeR technique may be utilized. These distance metrics may be computed efficiently using the proposed all-tree edit distance algorithm. The algorithm has been shown to be accurate in recognizing repeated (yet not necessarily identical) constructs in a variety of Web applications (including web pages), and improves upon previous approaches.

Figure 6:
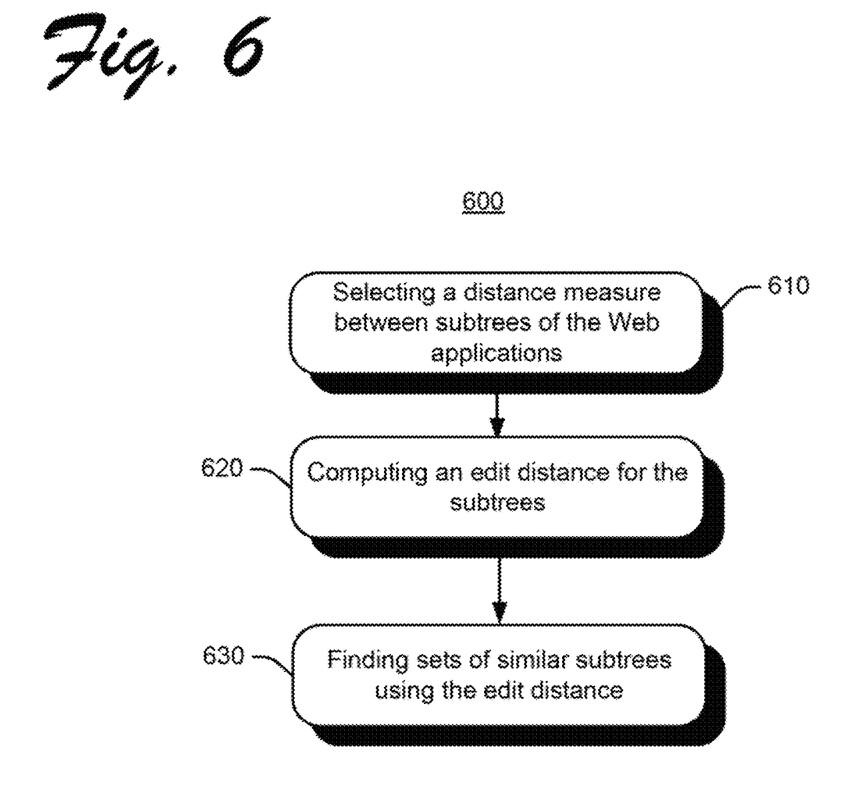
FIG. 6 is a flowchart illustrating example operations which may be implemented for mining Web applications.

FIG. 6 is a flowchart illustrating example operations which may be implemented for mining Web applications. Operations 600 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Operation 610 includes selecting a distance measure between subtrees of the Web applications. Operation 620 includes computing an edit distance for the subtrees. Operation 630 includes finding sets of similar subtrees using the edit distance with a Similar Sibling-Trees-aware RTDM (SiSTeR) approach. Finding similar structures in the Web applications disregards dissimilarity affected only by a number of sibling sub-trees.

The operations shown and described herein are provided to illustrate example implementations. It is noted that the operations are not limited to the ordering shown. Still other operations may also be implemented.

Still further operations may include finding repeating Document Object Model (DOM) structures in the subtrees. Operations may use a one-to-many replace operation and/or a many-to-one replace operation. The replace operation(s) may be computed in a dynamic programming regime. The one-to-many replace operation and many-to-one replace operation can be used to replace a series of consecutive replaces of one subtree with many subtrees. A cost of the replace operations is a sum of replaces. These new operations reduce a number of replace operations in data mining applications.

The operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method of mining Web applications, the method stored as computer readable instructions on a computer readable media and executed by a processor, the method comprising:
selecting a distance measure between subtrees of the Web applications according to a bottom-up approach;
computing an edit distance for the subtrees; and
finding sets of similar subtrees using the edit distance with a Similar Sibling-Trees-aware Restricted Top-Down edit Metric (RTDM) (SiSTeR) approach, wherein the SiSTeR approach detects a plurality of lists of different length as similar while disregarding a number of entries within each of the plurality of lists individually, and wherein finding similar structures in the Web applications disregards dissimilarity affected only by a number of sibling sub-trees.

2. The method of claim 1, further comprising finding repeating Document Object Model (DOM) subtrees.

3. The method of claim 1, further comprising using a one-to-many replace operation.

4. The method of claim 3, wherein the one-to-many replace operation is computed in a dynamic programming regime.

5. The method of claim 3, wherein the many-to-one replace operation is computed in a dynamic programming regime.

6. The method of claim 1, further comprising using a many-to-one replace operation.

7. The method of claim 1, wherein a one-to-many replace operation and a many-to-one replace operation replaces a series of consecutive replaces of one subtree with many subtrees.

8. The method of claim 7, wherein a cost of the replace operations is a sum of replaces.

9. The method of claim 7, further comprising reducing a number of replace operations.

10. A system for mining Web applications, the system including computer readable instructions stored on a computer readable media and executed by a processor to:
select a distance measure between subtrees of the Web applications according to a bottom-up approach;
compute an edit distance for the subtrees; and
find sets of similar subtrees using the edit distance with a Similar Sibling-Trees-aware Restricted Top-Down edit Metric (RTDM) (SiSTeR) approach, wherein the SiSTeR approach detects a plurality of lists of different length as similar while disregarding a number of entries within each of the plurality of lists individually, and wherein finding similar structures in the Web applications disregards dissimilarity affected only by a number of sibling sub-trees.

11. The system of claim 10, further comprising executing the instructions to find repeating Document Object Model (DOM) subtrees.

12. The system of claim 10, further comprising executing the instructions using a one-to-many replace operation.

13. The system of claim 10, further comprising executing the instructions many-to-one replace operation.

14. The system of claim 10, further comprising executing the instructions in a dynamic programming regime.

15. The system of claim 10, further comprising executing the instructions to reduce a number of replace operations.

16. The system of claim 10, wherein a one-to-many replace operation and a many-to-one replace operation replaces a series of consecutive replaces of one subtree with many subtrees.

17. The system of claim 10, wherein a cost of the replace operations is a sum of replaces.

18. The system of claim 10, wherein the Web applications include at least search engines, video sites, and content pages.

* * * * *